(12) United States Patent
Liu et al.

(10) Patent No.: US 12,073,602 B2
(45) Date of Patent: Aug. 27, 2024

(54) AUTOMATED KEY FRAME SELECTION

(71) Applicant: Robert Bosch GmbH, Stuttgart (DE)

(72) Inventors: Chun-Hao Liu, Fremont, CA (US); Jayanta Kumar Dutta, San Jose, CA (US); Naveen Ramakrishnan, Campbell, CA (US)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 17/674,230

(22) Filed: Feb. 17, 2022

(65) Prior Publication Data

US 2023/0260251 A1   Aug. 17, 2023

(51) Int. Cl.
*G06V 10/00*    (2022.01)
*G06V 10/762*   (2022.01)
*G06V 10/77*    (2022.01)

(52) U.S. Cl.
CPC ........ *G06V 10/762* (2022.01); *G06V 10/7715* (2022.01)

(58) Field of Classification Search
CPC .. G06V 10/82; G06V 10/761; G06V 10/7747; G06V 10/30; G06V 10/454; G06V 10/772; G06V 40/172; G06F 18/2148; G06F 18/22; G06F 18/2415; G06N 3/045; G06N 3/084
See application file for complete search history.

(56) References Cited

U.S. PATENT DOCUMENTS

| | | | |
|---|---|---|---|
| 10,963,493 B1* | 3/2021 | Hu | G06N 3/042 |
| 2015/0248586 A1* | 9/2015 | Gaidon | G06V 20/40 382/103 |
| 2018/0053057 A1* | 2/2018 | De Souza | G06V 20/41 |
| 2019/0205649 A1* | 7/2019 | Ananthanarayanan | G06V 10/87 |
| 2019/0206400 A1* | 7/2019 | Cui | B25J 9/1697 |
| 2020/0143457 A1* | 5/2020 | Manmatha | G06F 3/04812 |
| 2021/0142068 A1* | 5/2021 | Aliamiri | G06V 20/47 |
| 2023/0196831 A1* | 6/2023 | Xiong | G06V 20/30 382/103 |
| 2023/0260251 A1* | 8/2023 | Liu | G06V 20/52 382/103 |

OTHER PUBLICATIONS

Geiger et al., Vision Meets Robotics: The KITTI Dataset, The International Journal of Robotics Research, vol. 32, Issue 11, pp. 1231-1237, 2013.

He et al., Deep Residual Learning for Image Recognition, 2016 IEEE Conference on Computer Vision and Pattern Recognition (CVPR), 2016, pp. 770-778, doi: 10.1109/CVPR.2016.90.

(Continued)

*Primary Examiner* — Md K Talukder
(74) *Attorney, Agent, or Firm* — Brooks Kushman P.C.

(57) ABSTRACT

Identifying key frames of a video for use in training a machine learning model is provided. Object detection is performed to identify frames of a video including target classes of objects of interest. Feature extraction is performed on the identified frames to generate raw feature vectors. The feature vectors are compressed into lower dimension vectors. The compressed feature vectors are compressed into a plurality of clusters. The clustered compressed feature vectors are filtered to identify the key frames from each of the plurality of clusters. The key frames may be provided as a representative data set of the video.

20 Claims, 5 Drawing Sheets

(56) References Cited

OTHER PUBLICATIONS

Tan et al., EfficientDet: Scalable and Efficient Object Detection, 2020 IEEE/CVF Conference on Computer Vision and Pattern Recognition (CVPR), 2020, pp. 10778-10787, doi: 10.1109/CVPR42600.2020.01079.

Van Der Maaten et al., Visualizing High-Dimensional Data Using t-SNE. Journal of Machine Learning Research, vol. 9, 2579-2605, Nov. 2008.

* cited by examiner

AUTOMATED KEY FRAME SELECTION

TECHNICAL FIELD

Aspects of the disclosure relates the automatic selection key frames from unlabeled video frames, utilizing unsupervised learning and signal processing techniques.

BACKGROUND

The selection of information-containing frames from video is a challenging problem. There are two traditional approaches to selecting frames: random sampling and constant sampling. The random sampling approach involves capturing random samples from a large pool of video frames. The constant sampling approach involves adopting a constant sampling in time, e.g., choosing every $10^{th}$ of the frames from each video.

SUMMARY

In one or more illustrative examples, a method for identifying key frames of a video is provided. Object detection is performed to identify frames of a video including target classes of objects of interest. Feature extraction is performed on the identified frames to generate raw feature vectors. The feature vectors are compressed into lower dimension vectors. The compressed feature vectors are compressed into a plurality of clusters. The clustered compressed feature vectors are filtered to identify the key frames from each of the plurality of clusters. The key frames are provided as a representative data set of the video.

In one or more illustrative examples, a system for identifying key frames of a video includes one or more processors programmed to perform object detection to identify frames of a video including target classes of objects of interest; extract features of the identified frames to generate raw feature vectors; compress the feature vectors into lower dimension vectors; cluster the compressed feature vectors into a plurality of clusters; filter the clustered compressed feature vectors to identify the key frames from each of the plurality of clusters; and provide the key frames as a representative data set of the video.

In one or more illustrative examples, a non-transitory computer-readable medium includes instructions for identifying key frames of a video that, when executed by one or more processors, cause the one or more processors to perform operations including to perform object detection to identify frames of a video including target classes of objects of interest; extract features of the identified frames to generate raw feature vectors; compress the feature vectors into lower dimension vectors; cluster the compressed feature vectors into a plurality of clusters; filter the clustered compressed feature vectors to identify the key frames from each of the plurality of clusters; and provide the key frames as a representative data set of the video.

DETAILED DESCRIPTION

Figure 1:
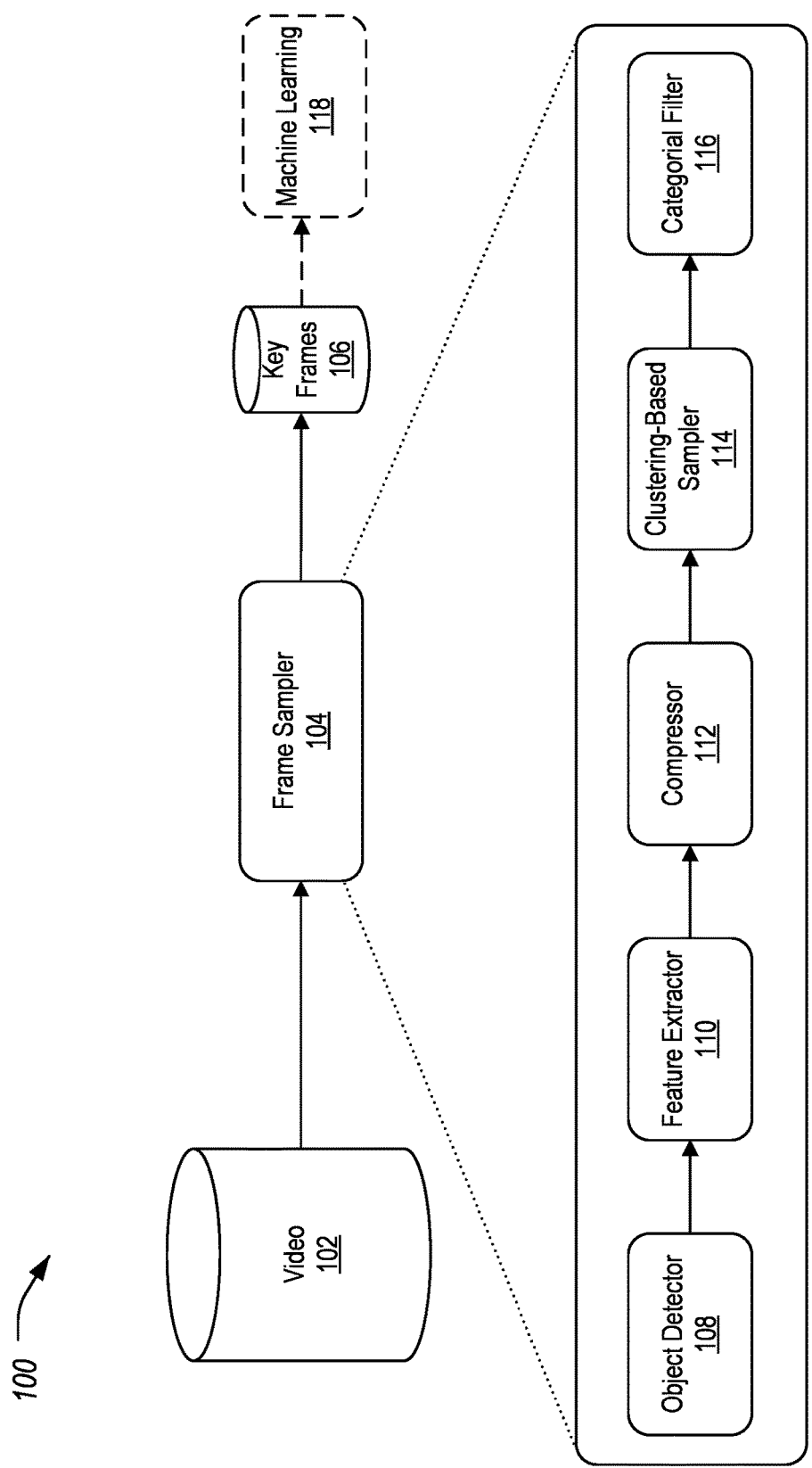
FIG. 1 illustrates an example system for determining key frames of a video.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Machine learning (ML) may be useful for various applications, such as an autonomous driving system or to set up a video surveillance system. A pre-requisite for a ML project is to collect a training set of data. Most ML projects employ a supervised training phase, meaning they require data to be labeled (e.g., labeling or creating bounding boxes around cars in images).

Video is one of the most common data sources, as it may be collected easily by mounting cameras and recording videos in a domain-specific environment. A video is simply a collection of consecutive frames with a constant frame rate. Desired frames may be selected from the video for further processing. Once the frames are selected, the data may be labeled. However, the labeling phase may require expensive manual effort. Effective training strategies for machine learning models may require selection of minimal, but high-quality, data points (frames in the case of videos). These frames should be selected with sufficient scenario diversity to ensure proper generalization from the trained machine learning model.

Many approaches to identifying key frames of a video have various disadvantages. For instance, many approaches fail to take features of the frames into consideration. This may lead to duplication of data in the frame, selection as many of video frames can be similar to one other. This situation may be exacerbated where there is significant stop time during a recording, in which many static frames may be collected. This may also occur if there are multiple round-trips along the video capture route. Another disadvantage is that current approaches do not consider the object instances which may occur in the frames. For instance, during several periods of time along the video capture there may be no interesting objects present. Processing those non-interesting frames may introduce unneeded effort into the data collection and data labeling efforts.

An improved approach to determining key frames of a video is described in detail herein. Definitionally, given total N collected video frames, the approach is to select K of them that optimizes a certain pre-defined objective (e.g., diversity of objects). It may be assumed that the final ML task is known, for, e.g., to detect person, car, and bicycle classes for autonomous driving safety purpose. Therefore, a predefined set of target classes $c_i \in C$ may be defined, where $|C|=M$. As one example, $C=\{c_1=\text{person}, c_2=\text{car}, c_3=\text{bicycle}\}$, $M=3$. It should be noted that the final ML task does not have to be object detection; instead, the defined target classes are given to ensure instances of those classes are included in the final frame selection with high certainty.

FIG. 1 illustrates an example system 100 for the selection of key frames 106 of a video 102. As shown, a video 102 is received as input. In place of a random sampling or constant sampling scheme, a directed frame sampler 104 is implemented. The directed frame sampler 104 provides a set of selected key frames 106. The directed frame sampler 104 includes an object detector 108 configured to identify classes of objects in the video 102. A feature extractor 110 may operate based on the results of the object detector 108 to create feature vectors from the object frames. A compressor 112 may operate to reduce the dimensionality of the feature vectors. A clustering-based sampler 114 may be used to cluster the feature vectors according to content. A categorial filter 116 may be used to select the key frames 106 from the clusters. The key frames 106 may then be used for further processing, such as to be used as input for machine learning 118. Each of these aspects of the directed frame sampler 104 is discussed in detail herein.

The video 102 may include a sequence of images, typically referred to as frames, that are captured over time. The video 102 may be captured at various resolutions (e.g., SD, HD, full-HD, UHD, 4K, etc.), frame rate (15, 24, 30, 60, 120 frames per second, etc.), dynamic range (8 bits, 10 bits, and 12 bits per pixel per color, etc.), and frequency and count of color channels (e.g., infrared, RGB, black & white, etc.). The video 102 may be captured using one or more video camera devices, for example by mounting cameras and recording videos in a domain-specific environment. The environment may be chosen as including classes of objects to be used for training of a machine learning model.

Frames of the video 102 may be labeled to allow the video 102 to be used as input for machine learning 118. However, the quantity of frames that are included in the video 102 may be too numerous to allow for each frame of the video 102 to be labeled. Thus, the directed frame sampler 104 may receive the video 102 and may be used to select a subset of the frames of the video 102 for use in the machine learning 118. This subset of the frames may be referred to herein as the key frames 106.

The operation of the directed frame sampler 104 may begin with the user of the object detector 108. The object detector 108 may be configured to apply one or more pre-trained object detectors to perform inference on the frames of the video 102. The object detectors may have been previously trained to identify one or more classes of objects of interest. The object detection inference process may be responsive for performing image classification and localization on each frame of the video 102. Each frame may include none, or one or more objects of the various classes. More formally, for each frame $x_j$, the object detector 108 may obtain a prediction score $s_{ij} \in [0, 1]$ for each detected object instance i with class $o_{ij}$. A detection threshold $\tau$ may be set to filter out the low confident predictions. This may be done to discard object instances with $s_{ij} < \tau$. Frames without target class objects being detected may also be discarded, i.e., for the frame $x_j$, all detected object instance classes $o_{ij}$ do not belong to C. After the object detection, the remainder of frames may be considered to fall into an interest of class category with sufficient confidence. (It should be noted that, if in the target dataset there is no overlap between the target classes for which machine learning 118 is desired and the classes which are used in the pretrained models of the object detectors, the object detection step may be omitted.)

The feature extractor 110 of the directed frame sampler 104 may be configured to receive the frames with targeted objects identified by the object detector 108. The feature extractor 110 may be configured to reduce the dimensionality of the pixel data of the frames of the video 102 into a representation of features that describe the frames of the video 102 data with sufficient accuracy to facilitate machine learning. As some non-limiting examples, features that may be extracted may include edges, corners, blobs, ridges, arbitrary shapes, etc. The feature extractor 110 may be applied on each frame $x_j$ to obtain its feature vector $v_j \in R^L$. Note that a good feature vector usually has high dimension. In an example, the feature extractor 110 may include a pre-trained model with an L=2048. As some non-liming examples, the feature extractor may use various algorithmic methods, such as the Canny edge detector, a Sobel filter, Harris & Stephens corner detection, a Laplacian of Gaussian blob detector, etc. In other examples, a deep learning based feature extractor may be utilized, e.g., a pre-trained neural network designed to extract features.

The feature extractor 110 may be used to remove redundant frames from the frames identified by the object detector 108. It may be observed that consecutive frames have similar objects and semantics, with a difference related to motion as opposed to other aspects. Thus, such consecutive frames may be unlikely to add more information to the final machine learning 118 task. Therefore, the feature extractor 110 may perform operations to aid in the removal of the redundancy of such frames if the frames have identical or near-identical feature vectors $v_j$.

Figure 3:
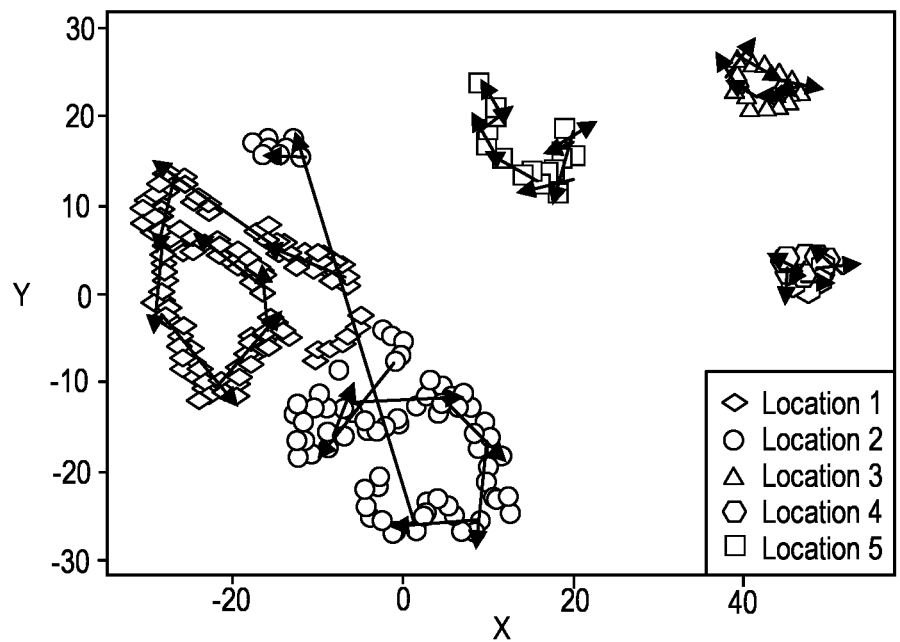
FIG. 3 illustrates an example 2D feature map after feature extraction following by feature compression.
Figure 4:
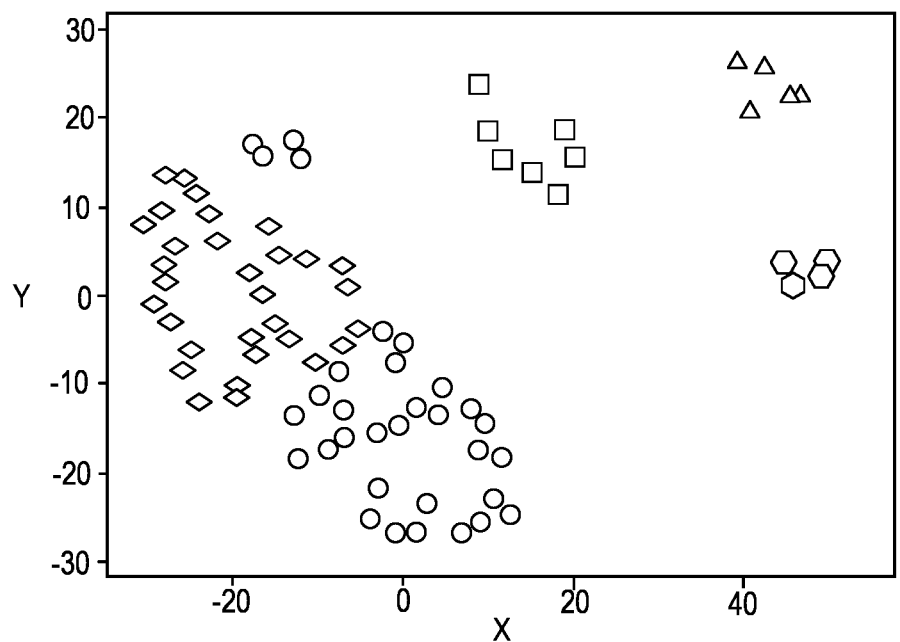
FIG. 4 illustrates an example 2D feature map after cluster-based sampling and categorial filtering.

The compressor 112 may be configured to compress the output feature vector from the feature extractor 110 into a lower dimension vector. This may be done, for example, to ease visualization of the feature vectors and to relieve the burden for the following clustering-based sampler 114. In the example as shown in FIGS. 3-4, t-distributed stochastic neighbor embedding (t-SNE) is used as the compressor 112 for visualizing high-dimensional data by giving each datapoint a location. In other examples, feature compression may be performed using various approaches, such as principal component analysis, determining norms of a vector of the features, hashing of the feature values, and/or linear regression. In one non-limiting example the feature vector $v_j$ may be compressed from $R^L$ to $R^2$ denoted herein as $\tilde{v}_j$.

The clustering-based sampler 114 may be configured to sample data points from the compressed feature vector space using an unsupervised clustering method. As close by feature vectors may result in similar semantics, which is redundant to the final task, these feature vectors may be segregated via the clustering. Unsupervised clustering may accordingly be useful in achieving this aspect. Each cluster may be segmented from others to limit or remove overlap. Specifically, a clustering algorithm may be run on $\tilde{v}_j$, set to generate K clusters. One of the samples within each cluster K may therefore be chosen as a candidate for final selection for inclusion in the key frames 106.

The categorial filtering 116 may be configured to filter the clustered to choose the final selection. The categorial filtering 116 may receive the K clusters for $\tilde{v}_j$ from the clustering-based sampler 114. A cluster label may be defined for each $\tilde{v}_j$ as $l_j$, where $l_j \in [1, K]$.

In one implementation the categorial filtering 116 may choose a random sample within each cluster as the final selection. This may be done to ensure that each sample is far enough from each other, covering the whole feature space, and also including the target classes. While such an approach is simple, it may not take into account imbalanced target classes. For instance, if there is a high imbalance occurring among target classes C (for, e.g., cars are more probable than humans on highway videos), then a biased sampling may occur toward classes with a higher probability of appearing if the pure random sampling scheme is utilized. This sampling bias may affect the final selected frames to be biased toward those commonly appearing classes.

In another implementation, the categorial filtering 116 may sample within each cluster uniformly among target classes, i.e., to select a class c with probability 1/M. If a class c is picked, the categorial filtering 116 searches for the frame with the median detection score to be selected, i.e., the one frame $argmedian_j s_{ij} | o_{ij} = c$ from each cluster. A reason for choosing a median as opposed to the highest score is that if the categorial filtering 116 picks only those easy examples, in later training stages the resultant model may suffer from training with limited object diversity, causing the model to suffer from overfitting issues. It should also be noted that if there is no object instance with class c being found, a frame that is closest to the cluster centroid in terms of Euclidean distance in feature space may be chosen. The result of the categorial filtering 116 may be to collect K frames, one for each of the clusters.

These frames may be used as the selected key frames 106 for further processing. For example, the key frames 106 may be used as input for machine learning 118 within the domain of the video 102. An example of operation of the directed frame sampler 104 is illustrated in further detail in FIGS. 2-4

Figure 2:
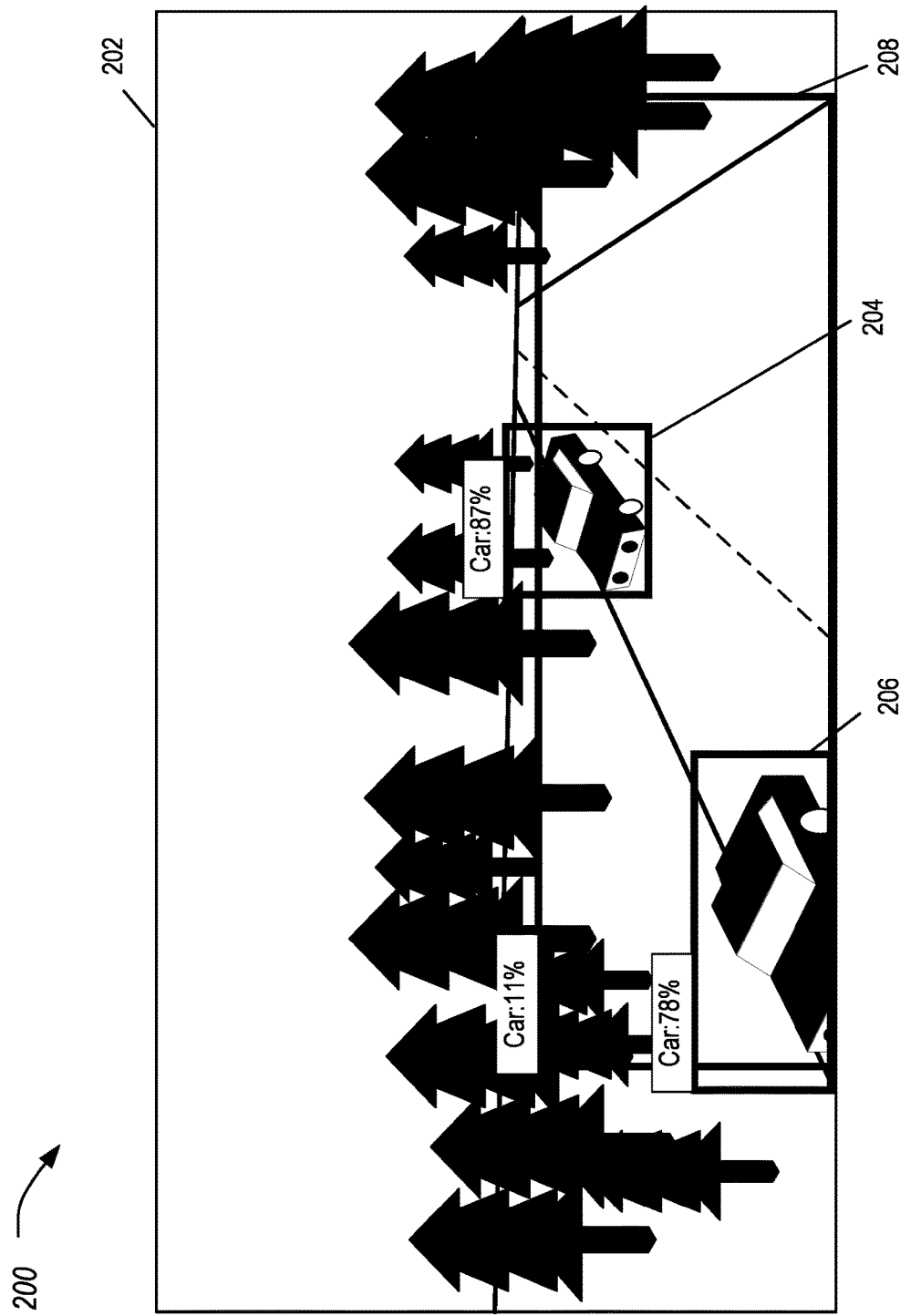
FIG. 2 illustrates an example of object detection results with corresponding detection scores and classes.

FIG. 2 illustrates an example 200 of a detection result for an input frame 202 of the video 102. In an example, the detection result may be computed by the object detector 108. As can be seen, the pre-trained model of the object detector 108 captures two vehicles in the frame 202, with high prediction scores. More specifically, as shown at 204 a first vehicle is located with a predicted accuracy of 87%, and as shown at 206 a second vehicle is located with a predicted accuracy of 78%. As shown at 208, the roadway is detected as being a vehicle with a predicted accuracy of 11%. Thus, this third prediction may be discarded as failing to meet the minimum probability threshold. These results indicate that the object detector 108 for vehicles is operating to accurately capture objects of that class in the frame 202 of the video 102.

It should be noted that while many examples herein relate to the vehicle domain, the described techniques are applicable in other domains for which key frames 106 may be desired to use for further processing. As an example, the domain may include video 102 in which animals are to be detected. As another example, the domain may include video 102 in which food items are to be detected. As yet another example, the domain may include video 102 from security cameras where intruders, customers, or other objects are to be detected. As an even further example, the video 102 domain may be a factory or other manufacturing plant where defects or other properties of manufactured products are to be identified.

FIG. 3 illustrates an example 300 of a 2-D feature map after the application of the feature extractor 110 and the compressor 112 to the results of the object detector 108. The X and Y axes denote compressed dimensions of the feature map distances in a data space. For sake of illustration, the frames 202 originating from the same category of video 102 are shown with the same symbol. Note that location 1 and location 2 are two videos 102 captured for the same location but during different time periods. This is why their feature maps are close in feature space, and are placed overlapping with one another. Other location videos 102 more dissimilar from one other in terms of features and are accordingly separated apart on the feature map. The arrows in FIG. 3 denote the vehicle driving route from the beginning of the video 102 to the end with a constant frame sampling.

FIG. 4 illustrates an example 400 of the feature map after application of the clustering-based sampler 114 and the categorial filter 116. The X and Y axes again denote compressed dimensions of the feature map distances in a data space. Thus, after performance of the k-means sampling and categorical filtering, the frames 202 are now sparsely distributed into a set of key frame 106. This is far fewer frames as compared to the original 2-D feature map shown in FIG. 3. Moreover, due to the operation of the directed frame sampler 104, the key frame 106 may be guaranteed to be samples cover a wide variety of frames 202 across the whole video 102. Further, the key frames 106 have a high confidence of object instances being identified from the target classes, without undue duplication.

By using the directed frame sampler 104, a machine learning model may be trained with a smaller amount of labeled data as input. This is because the key frames 106 are chosen from a set of frames that include the target classes. Similarly, higher model accuracy may be achieved with the same amount of labeled data. Yet further, consistent high model accuracy on test set as well as after the real deployment.

Figure 5:
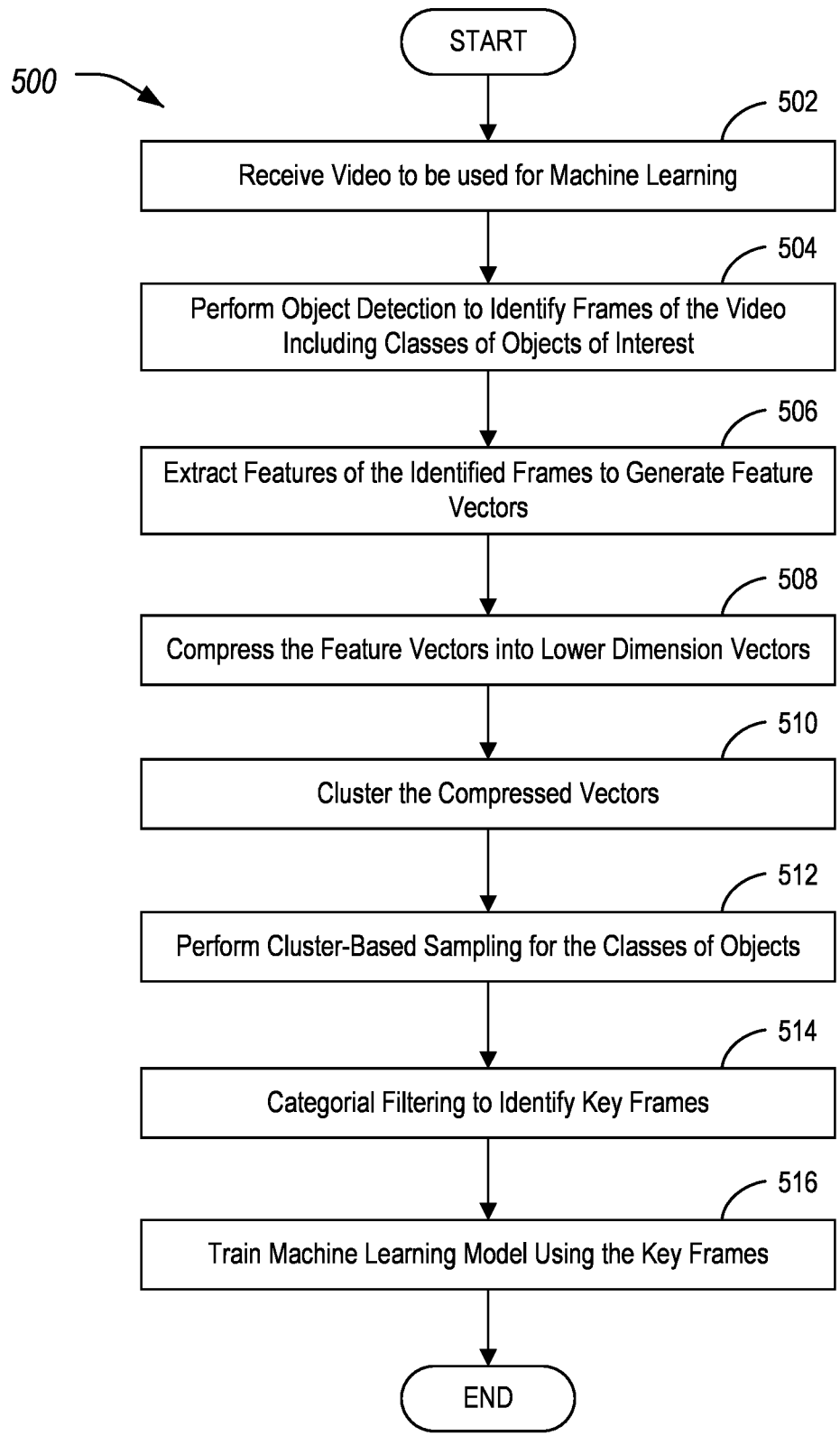
FIG. 5 illustrates an example process for utilizing the directed frame sampler to identify key frames of a video for use in training a machine-learning model.

FIG. 5 illustrates an example process 500 for utilizing the directed frame sampler 104 to identify key frames 106 of a video 102 for use in training a machine-learning model. In an example, the process 500 may be performed by the directed frame sampler 104 as executed by one or more computing devices as discussed in further detail with respect to FIG. 6

At operation 502, the directed frame sampler 104 receives video 102. In an example the video 102 may include one or more videos 102 of image data in a domain for which machine learning is desired.

At operation 504, the directed frame sampler 104 utilizes the object detector 108 to perform object detection to identify frames 202 of the video 102 including classes of objects of interest. In an example, the object detector 108 may utilize one or more pre-trained object detectors to perform inference on the frames of the video 102. The object detectors may have been previously trained to identify one or more classes of objects of interest. FIG. 2 illustrates an example of such objects of interest that are detected by the object detector 108.

At operation 506, the directed frame sampler 104 utilizes the feature extractor 110 to extract features of the identified frames frame 202 to generate feature vectors. In an example, the feature extractor 110 may identify feature vectors with a high dimensionality such as 2048. The feature extractor 110 may additionally remove frames 202 if the frames 202 have identical or near-identical feature vectors.

At operation 508, the directed frame sampler 104 utilizes the compressor 112 to compress the feature vectors into lower dimension vectors. For instance, after being culled for uniqueness at operation 506 the resultant unique feature vectors may be reduced in dimensionality.

At operation 510, the directed frame sampler 104 utilizes the clustering-based sampler 114 to cluster the compressed vectors. In an example, the reduced feature vectors may be clustered by an unsupervised clustering algorithm according to their placement in the lower dimensional representation. FIG. 3 illustrates an example of the features as reduced to a two-dimensional representation and clustered.

At operation 512, the directed frame sampler 104 performs cluster-based sampling for the classes of objects. In an example, the categorial filtering 116 may sample within each cluster uniformly among target classes, i.e., to select a class c with probability 1/M. This may be done to overcome a potential for sampling bias toward commonly appearing classes.

At operation 514, the directed frame sampler 104 utilizes the categorial filter 116 to filter the clustered frames 202 to identify the key frames 106. In an example, the categorial filter 116 may identify one key frame 106 from each of the clustered determined at operation 510. This one key frame 106 may, in one example, be the median frame as noted above. FIG. 4 illustrates an example of the identified key frames 106.

At operation 516, the directed frame sampler 104 provides the key frames 106 for machine learning 118. In an example, the set of key frames 106 may be provided to a training phase of a machine learning model in the domain for which machine learning is desired. After operation 514, the process 500 ends.

Figure 6:
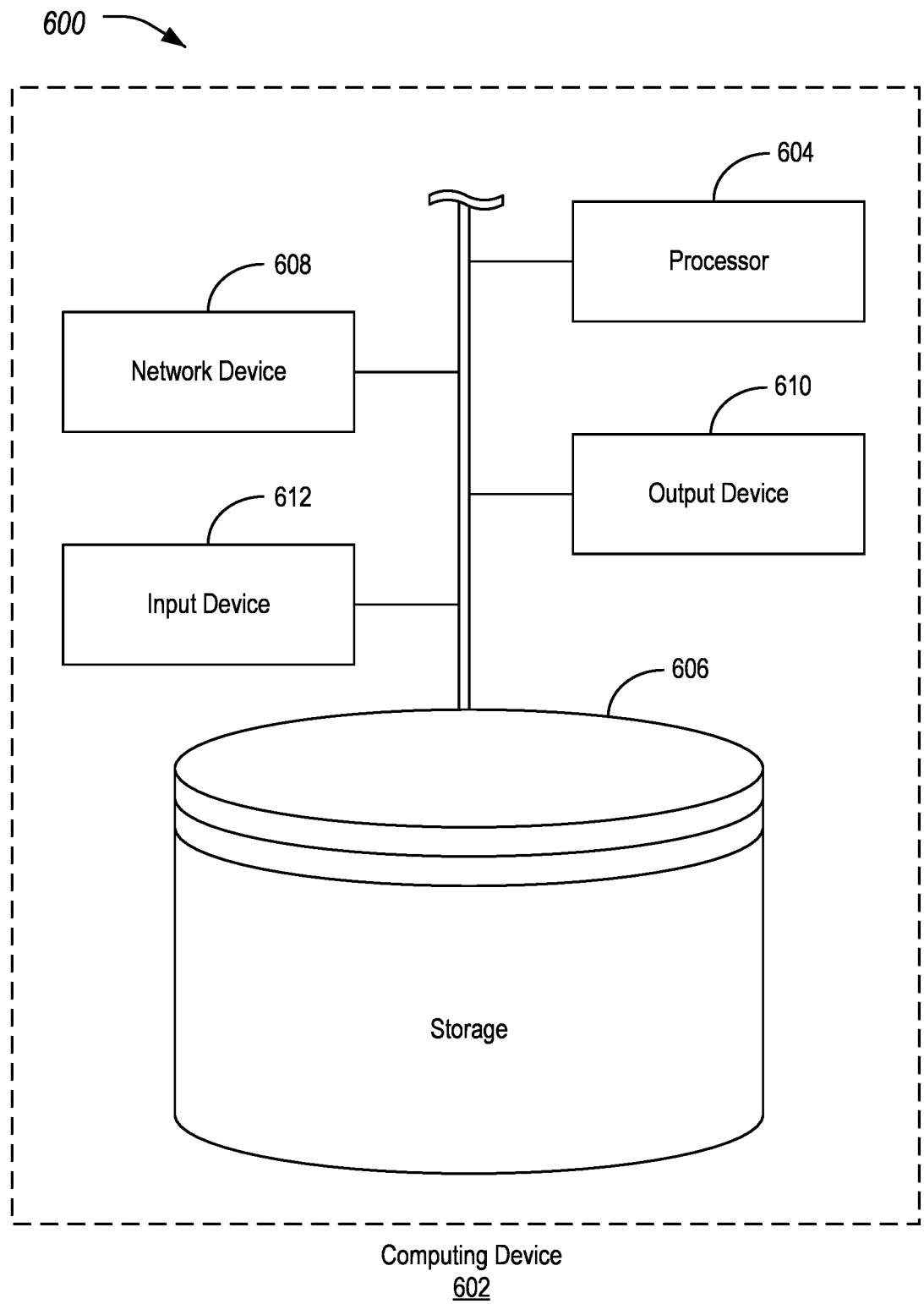
FIG. 6 illustrates an example system for utilizing the directed frame sampler to identify key frames of a video for use in training a machine-learning model.

FIG. 6 illustrates an example 600 of a computing device 602 for utilizing the directed frame sampler to identify key frames of a video for use in training a machine-learning model. Referring to FIG. 6, and with reference to FIGS. 1-5, the hardware performing the operations of the directed frame sampler 104 may be an example of such a computing device 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families. In some examples, a neural processing unit (NPU) may be applied, e.g., if pretrained machine learning models are being used.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least 2D and optionally 3D graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable computing device 602 to send and/or receive data from external devices over networks. Examples of suitable network devices 608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for identifying key frames of a video, comprising:
performing object detection to identify frames of a video including target classes of objects of interest;
extracting features of the identified frames to generate raw feature vectors;
compressing the feature vectors into lower dimension vectors;
clustering the compressed feature vectors into a plurality of clusters;
filtering the clustered compressed feature vectors to identify the key frames from each of the plurality of clusters, including selecting the key frames by including one key frame from each cluster determined as having a median detection score for a target class of the target classes of objects of interest; and
providing the key frames as a representative data set of the video.

2. The method of claim 1, further comprising training a machine learning model using the key frames.

3. The method of claim 1, wherein the object detection includes:
utilizing one or more pre-trained object detectors to perform inference on the frames of the video to identify objects and corresponding detection probabilities; and
filtering the identified objects to ensure at least a minimum detection probability.

4. The method of claim 1, further comprising excluding the identified frames having identical feature vectors to other of the identified frames before compressing the raw feature vectors into the compressed feature vectors.

5. The method of claim 1, further comprising utilizing an unsupervised clustering algorithm to generate the plurality of clusters according to distance in feature space between the compressed feature vectors.

6. The method of claim 1, further comprising performing cluster-based sampling for the classes of objects to sample within each of the plurality of clusters uniformly among the target classes.

7. The method of claim 1, wherein if when no such frame is found in a cluster of the plurality of clusters, selecting a centroid in terms of Euclidean distance in feature space of the compressed feature vectors.

8. A system for identifying key frames of a video, comprising:
one or more processors programmed to:
perform object detection to identify frames of a video including target classes of objects of interest;
extract features of the identified frames to generate raw feature vectors;
compress the feature vectors into lower dimension vectors;
cluster the compressed feature vectors into a plurality of clusters;
filter the clustered compressed feature vectors to identify the key frames from each of the plurality of clusters, including to perform cluster-based sampling for the classes of objects to sample within each of the plurality of clusters uniformly among the target classes; and
provide the key frames as a representative data set of the video.

9. The system of claim 8 wherein the one or more processors are further programmed to train a machine learning model using the key frames.

10. The system of claim 8, wherein the one or more processors are further programmed to:
utilize one or more pre-trained object detectors to perform inference on the frames of the video to identify objects and corresponding detection probabilities; and
filter the identified objects to ensure at least a minimum detection probability.

11. The system of claim 8, wherein the one or more processors are further programmed to exclude the identified frames having identical feature vectors to other of the identified frames before compressing the raw feature vectors into the compressed feature vectors.

12. The system of claim 8, wherein the one or more processors are further programmed to utilize an unsupervised clustering algorithm to generate the plurality of clusters according to distance in feature space between the compressed feature vectors.

13. The system of claim 8, wherein the one or more processors are further programmed to select the key frames by including one key frame from each cluster determined as having a median detection score for a target class of the target classes of objects of interest.

14. The system of claim 13, wherein when no such frame is found in a cluster of the plurality of clusters, the one or more processors are further programmed to select a centroid in terms of Euclidean distance in feature space of the compressed feature vectors.

15. A non-transitory computer-readable medium comprising instructions for identifying key frames of a video that, when executed by one or more processors, cause the one or more processors to perform operations including to:
perform object detection to identify frames of a video including target classes of objects of interest;
extract features of the identified frames to generate raw feature vectors;
compress the feature vectors into lower dimension vectors;
cluster the compressed feature vectors into a plurality of clusters;
filter the clustered compressed feature vectors to identify the key frames from each of the plurality of clusters, including to select the key frames by including one key frame from each cluster determined as having a median detection score for a target class of the target classes of objects of interest, wherein when no such frame is found in a cluster of the plurality of clusters, the selection includes to select a centroid in terms of Euclidean distance in feature space of the compressed feature vectors; and
provide the key frames as a representative data set of the video.

16. The medium of claim 15, further comprising instructions that, when executed by the one or more processors cause the one or more processors to perform operations including to train a machine learning model using the key frames.

17. The medium of claim 15, further comprising instructions that, when executed by the one or more processors cause the one or more processors to perform operations including to:
- utilize one or more pre-trained object detectors to perform inference on the frames of the video to identify objects and corresponding detection probabilities; and
- filter the identified objects to ensure at least a minimum detection probability.

18. The medium of claim 15, further comprising instructions that, when executed by the one or more processors cause the one or more processors to perform operations including to exclude the identified frames having identical feature vectors to other of the identified frames before compressing the raw feature vectors into the compressed feature vectors.

19. The medium of claim 15, further comprising instructions that, when executed by the one or more processors cause the one or more processors to perform operations including to utilize an unsupervised clustering algorithm to generate the plurality of clusters according to distance in feature space between the compressed feature vectors.

20. The medium of claim 15, further comprising instructions that, when executed by the one or more processors cause the one or more processors to perform operations including to perform cluster-based sampling for the classes of objects to sample within each of the plurality of clusters uniformly among the target classes.

* * * * *